United States Patent
Whitehouse et al.

(10) Patent No.: US 7,094,840 B2
(45) Date of Patent: Aug. 22, 2006

(54) COMPOSITIONS COMPRISING LOW MOLECULAR WEIGHT POLYHYDROXYALKANOATES AND METHODS EMPLOYING SAME

(75) Inventors: Robert S. Whitehouse, Lexington, MA (US); Luhua Zhong, Woburn, MA (US); Sean Daughtry, Roxbury, MA (US)

(73) Assignee: Metabolix, Inc., Cambridge, MA (US)

( * ) Notice: Subject to any disclaimer, the term of this patent is extended or adjusted under 35 U.S.C. 154(b) by 417 days.

(21) Appl. No.: 09/999,782

(22) Filed: Oct. 25, 2001

(65) Prior Publication Data

US 2002/0068810 A1    Jun. 6, 2002

Related U.S. Application Data

(60) Provisional application No. 60/243,818, filed on Oct. 27, 2000.

(51) Int. Cl.
*C08L 67/04* (2006.01)
*C08G 63/06* (2006.01)
*C08K 5/10* (2006.01)

(52) U.S. Cl. ................ 525/450; 523/124; 523/125; 523/128; 524/317; 524/320; 528/361

(58) Field of Classification Search ................ 428/413, 428/913; 528/361; 523/124, 125, 128; 156/326; 524/317, 320
See application file for complete search history.

(56) References Cited

U.S. PATENT DOCUMENTS

| | | | |
|---|---|---|---|
| 4,324,880 A | 4/1982 | Dhein et al. .................... 528/80 |
| 4,365,088 A | 12/1982 | Vanlautem et al. ........... 562/579 |
| 4,826,493 A | 5/1989 | Martini et al. ................ 604/327 |
| 4,876,331 A | 10/1989 | Doi .............................. 528/361 |
| 4,880,592 A | 11/1989 | Martini et al. ................ 264/514 |
| 4,910,145 A | 3/1990 | Holmes et al. ............... 435/259 |
| 4,968,611 A | 11/1990 | Traussnig et al. ............ 435/135 |
| 4,985,535 A | 1/1991 | Takada et al. ................ 528/272 |
| 5,107,016 A | 4/1992 | Pennetreau .................... 560/179 |
| 5,213,976 A | 5/1993 | Blauhut et al. ............... 435/135 |
| 5,245,023 A | 9/1993 | Peoples et al. ............... 536/23.2 |
| 5,250,430 A | 10/1993 | Peoples et al. ............... 435/232 |
| 5,286,842 A | 2/1994 | Kimura ......................... 528/354 |
| 5,292,860 A | 3/1994 | Shiotani et al. .............. 528/361 |
| 5,352,763 A | 10/1994 | Yamaguchi et al. .......... 528/361 |
| 5,461,139 A | 10/1995 | Gonda et al. ................. 528/361 |
| 5,480,794 A | 1/1996 | Peoples et al. ............... 435/232 |
| 5,512,669 A | 4/1996 | Peoples et al. ............... 536/23.2 |
| 5,516,883 A | 5/1996 | Hori et al. .................... 528/354 |
| 5,534,432 A | 7/1996 | Peoples et al. ............ 435/240.4 |
| 5,563,239 A | 10/1996 | Hubbs et al. ................. 528/361 |
| 5,583,187 A | 12/1996 | Sharak et al. ................ 525/438 |
| 5,614,576 A * | 3/1997 | Rutherford et al. .......... 524/270 |
| 5,625,030 A | 4/1997 | Williams et al. ............. 528/361 |
| 5,648,452 A * | 7/1997 | Schechtman et al. ........ 528/357 |
| 5,665,831 A | 9/1997 | Neuenschwander et al. ..... 525/415 |
| 5,700,344 A | 12/1997 | Edgington et al. ........... 156/336 |
| 5,753,724 A | 5/1998 | Edgington et al. ........... 523/124 |
| 5,753,765 A | 5/1998 | Thomsen ...................... 525/288 |
| 5,760,118 A * | 6/1998 | Sinclair et al. ............... 524/306 |
| 5,900,473 A | 5/1999 | Acevedo et al. ............. 528/271 |
| 5,939,488 A | 8/1999 | Nowicki et al. ............... 525/59 |
| 5,939,499 A | 8/1999 | Anderson et al. ............ 525/440 |
| 5,952,405 A | 9/1999 | Schoenberg et al. .......... 524/81 |
| 6,008,184 A | 12/1999 | Pluyter et al. ................ 510/524 |
| 6,034,149 A | 3/2000 | Bleys et al. .................. 521/155 |
| 6,043,292 A | 3/2000 | Huygens et al. ............. 521/133 |
| 6,071,998 A | 6/2000 | Muller et al. ................. 524/494 |
| 6,087,409 A | 7/2000 | Naber et al. .................. 521/155 |
| 6,087,410 A | 7/2000 | Falke et al. ................... 521/174 |
| 6,087,466 A | 7/2000 | Murata et al. ................. 528/83 |
| 6,174,990 B1 * | 1/2001 | Noda ............................ 528/361 |

FOREIGN PATENT DOCUMENTS

| | | |
|---|---|---|
| EP | 0 553 394 A1 | 8/1993 |
| EP | 0 741 177 A2 | 11/1996 |
| WO | WO 94/11440 | 5/1994 |
| WO | WO 99/05209 | 2/1999 |
| WO | WO 99/32536 | 7/1999 |

OTHER PUBLICATIONS

*Reports on Progress in Polymer Physics in Japan*, vol. 37, pp. 128-129 (1994).
Kharas et al., *Polymers of Lactic Acid* 94-137 (No date available).
Abe et al., Biosynthesis from gluconate of a random copolyester consisting of 3-hydroxy-butyrate and medium-chain-length 3-hydroxyalkanoates by Pseudomonas sp. 61-3, *Int. J. Biol. Macromol.*, vol. 16, pp. 36, 38, 40, (1994).
Muller et al., Poly(hydroxyalkanoates): A Fifth Class of Physiologically Important Organic Biopolymers?, *Angew. Chem. Int. Ed. Engl.*, vol. 32, pp. 477-502 (1993).
Seebach, et al. On the Preparation of Methyl and Ethyl (R)-(-)-3-Hydroxyvalerate by Depolymerization of a Mixed PHB/PHV Biopolymer, *Tetrahedron Letters*, vol. 25, No. 26, pp. 2747-2750 (1985), abstract.

(Continued)

*Primary Examiner*—Jeffrey B. Robertson
(74) *Attorney, Agent, or Firm*—Kilyk & Bowersox, P.L.L.C.

(57) ABSTRACT

Polyhydroxyalkanoate compositions including hot melt adhesive compositions, biodegradable wax compositions, and protective coating compositions are provided and include a low molecular weight polyhydroxyalkanoate, a terminally-modified polyhydroxyalkanoate, or both. The compositions are biodegradable and environmentally friendly. Methods of protecting an article, such as a food product like cheese, are also provided and include coating or encapsulating the article with a composition containing a low molecular weight polyhydroxyalkanoate, a terminally-modified polyhydroxyalkanoate, or both.

54 Claims, No Drawings

OTHER PUBLICATIONS

De Smet et al., Characterization of Intracellular Inclusions Formed by Pseudomonas oleovorans During Growth on Octane, *Journal of Bacteriology*, p. 870-878 (May 1983).

Wallen et al., Poly-β-hydroxyalkanoate from Activated Sludge, *Environmental Science & Technology*, vol. 8, pp. 576-579, (Jun. 1974).

Steinbuchel et al., A Pseudomonas strain accumulating polyesters of 3-hydroxybutyric acid and medium-chain-length 3-hydroxyalkanoic acids *Applied Microbiology and Biotechnology*, pp. 691-697 (1992).

Valentin et al., Identification of 4-hydroxyvaleric acid as a constituent of biosynthetic polyhydroxyalkanoic acids from bacteria, *Applied Microbiology and Biotechnology*, pp. 507-514, (1992).

Valentin et al., Identification of 4-hydroxyhexanoic acid as a new constituent of biosynthetic polyhydroxyalkanoic acids from bacteria, *Applied Microbiology and Biotechnology*, pp. 710-716, (1994).

Lee et al., Biosynthesis of copolyesters consisting of 3-hydroxybutyric acid and medium-chain-length 3-hydroxyalkanoic acids from 1,3-butanediol or from 3-hydroxybutyrate by Pseudomonas sp. A33, *Applied Microbiology and Biotechnology*, pp. 901-909, (1995).

Kato et al., Production of a novel copolyester of 3-hydroxybutyric acid and medium-chain-length 3-hydroxyalkanoic acids by Pseudomonas sp. 61-3 from sugars, *Applied Microbiology and Biotechnology*, pp. 363-370, (1996).

Valentin et al., Identification of 5-hydroxyhexanoic acid, 4-hydroxyheptanoic acid and 4-hydroxyoctanoic acid as new constituents of bacterial polyhydroxyalkanoic acids, *Applied Microbiology and Biotechnology*, pp. 261-267, (1996).

Brandl et al., Abilityof the phototrophic bacterium Rhodospirillum rubrum to produce various poly (β-hydroxyalkanoates): potential sources for biodegradable polyesters, *Int. J. Biol. Macromol.*, vol. 11, pp. 49-55, (1989).

Amos et al., Composition of poly-β-hydroxyalkanoate from Syntrophomonas wolfei grown on unsaturate fatty acid substrates, *Archives of Microbiology*, pp. 103-105, (1991).

Byrom, D. *Miscellaneous Biomaterials,* ICI BioProducts and Fine Chemicals, pp. 335-359.

Hocking et al., *Biopolyesters*, pp. 48-96.

Lafferty et al., *Microbial Production of Poly-β-hydroxybutyric Acid*, Chapter 6, pp. 137-176.

Gross et al., Polymerization of β-Monosubstituted-β-propiolactones Using Trialkylaluminum-Water Catalytic Sytems and Polymer Characterization, *Macromolecules*, pp. 2657-2668, (1988).

Dubois et al., Macromolecular Engineering of Polylactones and Polylactides, *Macromolecules*, pp. 4407-4412, (1993).

Borgne et al., Stereoelective polymerization of β-butyrolactone, *Polymer*, vol. 30, pp. 2312-2319, (Dec. 1989).

Tanahashi et al., Thermal Properties and Stereoregularity of Poly(3-hydroxybutyrate) Prepared from Optically Active β-Butyrolactone with a Zinc-Based Catalyst, *Macromolecules*, vol. 24, pp. 5732-5733 (1991).

Hori et al., Ring-Opening Copolymerization of Optically Active β-Butyrolactone with Several Lactones Catalyzed by Distannoxane Complexes: Synthesis of New Biodegradable Polyesters, *Macromolecules*, vol. 26, pp. 4388-4390 (1993).

Kemnitzer, Preparation of Predominantly Syndiotactic Poly (β-hydroxybutyrate) by the Tributyltin Methoxide Catalyzed Ring-Opening Polymerization of Racemic β-Butyrolactone, *Macromolecules*, vol. 26, pp. 1221-1229, (1993).

Hori et al., Ring-Opening Polymerization of Optically Active β-Butyrolactone Using Distannoxane Catalysts: Synthesis of High Molecular Weight Poly(3-hydroxybutyrate), *Macromolecules*, vol. 26, pp. 5533-5534 (1993).

Hocking et al., Syndiotactic poly[(R,S)-β-hydroxybutyrate] isolated from methylaluminoxane-catalyzed polymerization, *Polymer Bulletin*, vol. 30, pp. 163-170 (1993).

Xie et al., Ring-Opening Polymerization of β-Butyrolactone by Thermophilic Lipases, *Macromolecules*, vol. 30, pp. 6997-6998 (1997).

Jesudason et al., Synthetic Poly[(R,S)-β-hydroxyalkanoates] with Butyl and Hexyl Side Chains, *Macromolecules*, vol. 27, pp. 2595-2602 (1994).

International Search Report for International Application No. PCT/US01/45507.

\* cited by examiner

US 7,094,840 B2

COMPOSITIONS COMPRISING LOW MOLECULAR WEIGHT POLYHYDROXYALKANOATES AND METHODS EMPLOYING SAME

This application claims the benefit under 35 U.S.C. § 119(e) of prior U.S. Provisional Patent Application No. 60/243,818 filed Oct. 27, 2000, which is incorporated in its entirety by reference herein.

BACKGROUND OF THE INVENTION

The present invention relates to hot melt adhesive compositions, wax compositions, and coating compositions, and methods of using the same.

With a view to the environment, a serious need has arisen for biologically degradable products. Various plastic and wax materials, such as hot melt adhesives and protective coatings, are so often used and in such great volume that these products have a significant impact on the environment. A need exists for biodegradable hot melt adhesive and protective coating materials.

Hot melt adhesives are used in a great number of applications and are particularly employed in packaging materials for all sorts of goods. Unfortunately, most conventional hot melt adhesives are non-biodegradable, thus adversely affecting the environment. Those products that claim to be biodegradable are typically based on water sensitive polymers or additives and hence the degradation process is through dissolution rather than biodegradation. A need exists for a biodegradable hydrophobic hot melt adhesive composition that will provide sufficient adhesion for its intended use yet degrade years later and, thus, be environmentally friendly.

Many non-stable products, particularly food products such as cheese, are coated with a synthetic, non-biologically degradable plastic rind to improve product maturation and shelf-life. The plastic of such a rind cannot be recovered or recycled and thus presents a problem for the environment. Furthermore, such a coating must fulfill a large number of functions and a large number of requirements. The coating material must serve to prevent mechanical damage and attack by molds. The coating must offer both mechanical and hygienic protection, and it must be easy to apply, for example, by an immersion coating technique or by coating with a sponge or brush.

Cheese coatings should advantageously affect the luster and rind formation and must adhere well to the wet surface of the cheese. In addition, after drying, the coating must not crack or stick, for example, to cutting boards or other cheeses. The coating should also be semi-impermeable since CO2 and certain flavoring components must be able to diffuse through the coating in order not to adversely affect maturing of the cheese. Water vapor must also be allowed to pass through in a controlled manner so that natural maturing can occur without any question of excessive weight loss. Also, components must not diffuse into the cheese from the coating. Furthermore, the coating must keep well during prolonged storage. Any paraffinic wax layer that is subsequently applied to the latex coating must not peel off after vacuum packaging. In addition, machines used to apply the coating must be easy to clean.

Although biologically degradable and compostable coatings exist, they are generally water-soluble polymers which are consequently water-sensitive. Examples of these are polyvinyl alcohol, polyethylene oxide, and also proteins such as gelatin, casein, and the like. In the past, it has not been possible to use polyhydroxyalkanoate films as coatings in the foodstuffs industry because of the use of organic solvents and because of the need to heat the polyhydroxyalkanoates to the melting point thereof, which could unnecessarily damage the product. A need exists for a polyhydroxyalkanoate protective coating, layer or film that can be used as a protective coating for articles such as food products, in particular, cheese products, and that can be processed at relatively low temperatures and does not require the use of non-consumable organic solvents.

Surface active agents and solvents are also commonly used in a vast variety of industrial products and processes. Because of the large volume of surface active agents and solvents used worldwide in the many industrial product and process applications, a need exists for a new class of surface active agents and a new class of solvents that are biodegradable. Current biodegradable surfactant systems either do not meet required technical specifications or have a significant price disadvantage that make them uncompetitive with synthetic based systems.

SUMMARY OF THE INVENTION

It is therefore an object of this invention to provide degradable polymeric compositions, particularly oligomeric compositions, having improved hydrophobic biodegradation characteristics and that can be used as hot melt adhesives, protective coatings, surface active agents, and solvents.

It is another object of the present invention to provide hydrophobic biodegradable compositions suitable for use in a wide range of processing conditions.

All of the patents, patent applications, and publications mentioned throughout this application are incorporated herein in their entireties by reference and form a part of the present application.

The present invention relates, in part, to polyhydroxyalkanoate-containing hot melt adhesive, protective coating, and surface active agent compositions. The polyhydroxyalkanoate useful in the present invention is preferably an oligomer having a low molecular weight and/or that is terminally modified. Preferably, the polyhydroxyalkanoate oligomer has a number average molecular weight that is under about 50,000, and more preferably is from about 500 to about 8,000, and most preferably, from about 500 to about 3,000. Preferably, the number average molecular weight of the oligomer is greater than about 1,000, for example, from greater than about 1,000 up to about 50,000, or from greater than about 1,000 up to about 8,000.

The compositions of the present invention that contain a terminally modified polyhydroxyalkanoate oligomer contain a biodegradable polyhydroxyalkanoate having at least one terminal end group, and preferably both terminal groups, selected from:

a) —CO—CH=CR$^9$R$^{10}$;
b) —OR$^{11}$;
c) —COOR$^{12}$,
d) —COR$^{13}$; or
e) —O$^-$M$^+$ wherein R$^9$, R$^{10}$, R$^{11}$, R$^{12}$, or R$^{13}$, which are the same or different, represent saturated or unsaturated hydrocarbon radicals, halo- or hydroxy- substituted radicals, hydroxy radicals, nitrogen-substituted radicals, oxygen-substituted radicals, or a hydrogen atom, with the proviso that R$^{11}$ is not a hydrogen atom. M$^+$ is a counterion. Preferably, both of the terminal end groups of the PHA are selected from one of the above-described terminal end groups a)–e) wherein the terminal end groups can be the same or different. Alternatively, the PHA can have one of the above-described terminal end groups a)–e) and the other end group can end with hydrogen or —OH. Preferably, when the terminal end group is —OR$^{11}$, or —COR$^{13}$, the other end group is not —OH. These hydrophobic biodegradable polyhydroxyalkanoates can have any molecular weight such as from about 500 to about 1.5 million. More preferably, the molecular weight is from about 500 to about 500,000, more preferably from about 500 to less than 50,000, such as from about 500 to about 9,000. These polyhydroxyalkanoates can be polymers, oligomers, or monomers, collectively referred to as oligomers. Herein, the oligomeric polyhydroxyalkanoates used in the present invention are referred to as polyhydroxyalkanoates.

The hydrophobic biodegradable polyhydroxyalkanoates having low molecular weights according to the present invention can be made by a process that involves the hydrolysis or thermolysis of a polyhydroxyalkanoate under such conditions that will lead to a low molecular weight biodegradable polyhydroxyalkanoate oligomer.

The compositions of the present invention include hot melt adhesives, reactive hot melt adhesives, biodegradable waxes, and coating compositions for articles including food products. The hot melt adhesive compositions of the present invention can optionally contain at least one tackifying resin and at least one wax component. Preferably, up to about 60% by weight of the hot melt adhesive composition can be the tackifying resin and up to about 40% by weight of the composition can be the wax component. In addition, a reactive monomer or oligomer can be included in the hot melt adhesive compositions of the present invention.

The biodegradable wax compositions of the present invention can contain, in addition to the polyhydroxyalkanoate oligomer, at least one other component such as a wax component. The biodegradable waxes of the present invention preferably exhibit at least one of the following properties: a crystalline to microcrystalline structure; a capacity to acquire gloss when rubbed; a capacity to produce pastes or gels with suitable solvents or when mixed with other waxes; a low viscosity at just above the melting point; and a low solubility in solvents for fats at room temperature.

The coating compositions of the present invention include a polyhydroxyalkanoate oligomer and can further include other components such as stabilizers, plasticizers, fillers, dyes, emulsifiers, thickening agents, antioxidants, preservatives, cross-linking agents, other biologically degradable polymers, and anti-fungal agents.

The present invention also relates to a method for protecting an article by coating the article with a biologically degradable hydrophobic polyhydroxyalkanoate coating. Preferably, an aqueous dispersion of the polyhydroxyalkanoate is applied to the surface to be coated to control the gas and moisture transmission properties out of the product. In particular, the invention relates to the coating of surfaces that form part of a product to be supplied for consumption to a human being or animal and/or surfaces which form part of a product which is not resistant to high temperatures. A suitable example of a product that can be advantageously coated according to the present invention is a foodstuff, in particular, a cheese product. The hydrophobic polyhydroxyalkanoate coating of the present invention allows cheese to mature over a period of time. Generally, the maturation process is terminated by application of a paraffinic wax coating to form a totally moisture and gas impervious barrier and also to provide a coating more resistant to mechanical damage. For such purposes, a second polyhydroxyalkanoate coating can be applied to the surface of a first dried coating that includes a dried latex polyhydroxyalkanoate composition. This second coating can be carried out at a temperature at which the polyhydroxyalkanoate oligomer is molten, preferably in the range of from about 40° C. to about 90° C. More preferably, the gas transition temperature of the latex polyhydroxyalkanoate coating and the molten-applied second polyhydroxyalkanoate coating should not differ by more than 20° C. and preferably the glass transition temperatures are within a range of from about 0° to about −35° C. The molecular weight of the molten-applied polyhydroxyalkanoate second coating should be less than that of the polyhydroxyalkanoate latex polymer of the first coating, and preferably should differ by a number average molecular weight of more than about 10,000 and more preferably differ by a number average molecular weight of more than about 50,000.

It is to be understood that both the foregoing general description and the following detailed description are exemplary and explanatory only and are intended to provide further explanation of the present invention, as claimed.

DETAILED DESCRIPTION OF THE INVENTION

The present invention provides polyhydroxyalkanoate compositions useful as hot melt adhesive compositions, reactive hot melt adhesive compositions, biodegradable wax compositions, coating compositions, surface active agents, solvents, and methods of employing such compositions.

The compositions generally include one or more low molecular weight polyhydroxyalkanoates, one or more polyhydroxyalkanoates derived to contain one or more specified terminal groups, or a solution of one or more of such polyhydroxyalkanoates. Useful polyhydroxyalkanoates and methods of making the same are described in U.S. Patent Application Nos. 60/218,384, 60/225,902, and 60/227,127, which are incorporated herein in their entireties by reference. The compositions may include additional (optional) components to enhance processing or properties of the compositions or end products in which they are employed.

Several types of polyhydroxyalkanoates (PHAs) are known. It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics; PHAs with long side chains are more elastomeric. The former polymers have been known for about seventy years (Lemoigne & Roukhelman 1925), while the latter polymers are a relatively recent discovery (deSmet, et al., J. Bacteriol., 154:870–78 (1983)). Before this designation, however, PHAs of microbial origin containing both R-3-hydroxybutyric acid units and longer side chain units from C5 to C16, that is, containing from 5 to 16 carbon atoms, were identified (Wallen & Rowheder, Environ. Sci. Technol., 8:576–79 (1974)). A number of bacteria which produce copolymers of D-3-hydroxybutyric acid and one or more long side chain hydroxyacid units containing from five to sixteen carbon atoms have been identified more recently (Steinbuchel & Wiese, Appl. Microbiol. Biotechnol., 37:691–97 (1992); Valentin et al., Appl. Microbiol. Biotechnol., 36: 507–14 (1992); Valentin et al., Appl. Microbiol. Biotechnol., 40:710–16 (1994); Abe et al., Int. J. Biol. Macromol., 16:115–19 (1994); Lee et al., Appl. Microbiol. Biotechnol., 42:901–09 (1995); Kato et al., Appl. Microbiol. Biotechnol., 45:363–70 (1996); Valentin et al., Appl. Microbiol. Biotechnol., 46:261–67 (1996); U.S. Pat. No. 4,876, 331 to Doi). Useful examples of specific two-component copolymers include PHB-co-3-hydroxyhexanoate (Brandl et al., Int. J. Biol. Macromol., 11:49–55 (1989); Amos & McInerey, Arch. Microbiol., 155:103–06 (1991); U.S. Pat. No. 5,292,860 to Shiotani et al.). Chemical synthetic methods have also been applied to prepare racemic PHB copolymers of this type for applications testing (WO 95/20614, WO 95/20615, and WO 96/20621).

In addition to the aforementioned references which are incorporated herein by reference in their entireties, also incorporated herein by reference are the following U.S. patents relating to hot melt adhesives: U.S. Pat. Nos. 4,985,535; 5,583,187; 5,753,765; 5,900,473; 5,939,488; 5,939,499; and 5,952,405.

As PHAs have become increasingly available, they have been examined for their suitability in applications where they serve as a processing aid. For example, the use of PHA latex film in the production of CRT tube components is described in WO 96/17369.

For purposes of the present invention, the low molecular weight PHAs preferably exhibit a number average molecular weight of from about 500 to under 50,000, for example, under 20,000, more preferably from about 500 to about 8,000, and most preferably from about 500 to about 3,000. Preferably, the number average molecular weight of the oligomer is greater than about 1,000, for example, from greater than about 1000 up to about 50,000, or from greater than about 1,000 up to about 8,000. In one embodiment of the present invention, the molecular weight of the PHAs is less than about 20,000 and preferably from about 500 to about 9,500 or lower. Another suitable molecular weight range for purposes of the present invention is from about 500 to about 5,000, or from about 500 to about 1,000. For hot melt adhesive applications, lower molecular weight PHAs in these ranges are more desirable than the higher molecular weight PHAs in these ranges.

The PHAs preferably contain one or more units of the following formula:

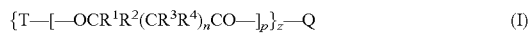

$$\{T-[-OCR^1R^2(CR^3R^4)_nCO-]_p\}_z-Q \qquad (I)$$

wherein n is 0 or an integer up to about 100; p is from about 0 to about 100; $R^1$, $R^2$, $R^3$, and $R^4$, which are the same as each other or different from one another, are each independently selected from saturated and unsaturated hydrocarbon radicals, halo- and hydroxy-substituted radicals, hydroxy radicals, halogen radicals, nitrogen-substituted radicals, oxygen-substituted radicals, or hydrogen atoms; T is selected from hydrogen, an alkyl, aryl, alkaryl, or aralkyl group containing from about 1 to about 20 carbon atoms, or an R'''COO carboxylate group wherein R''' is an aliphatic or aromatic hydrocarbon radical containing from about 1 to about 20 carbon atoms; and Q is selected from:

a hydroxy radical or an OR" radical wherein R" is a substituted or unsubstituted alkyl, aryl, alkaryl, or aralkyl radical containing from 1 to about 20 carbon atoms;

OAOH;
OAOOC(CH$_2$)$_y$CHROH;
OAO{OC(CH$_2$)$_y$CHRO}$_x$H; or
B;

wherein each R is independently selected from hydrogen, a saturated alkyl group having from about 1 to about 16 carbon atoms, an unsaturated alkyl group having from about 2 to about 16 carbon atoms, or mixtures thereof; A is (CH$_2$)$_m$ or (CH$_2$CHR'O)$_m$, where m is from about 1 to about 50 and R' is hydrogen or methyl; x is from about 2 to about 50; y is from 0 to about 3; and B is selected from:

trimethylol propane when z is 1, 2, 3 or a mixture of 1, 2, and/or 3, glycerol when z is 1, 2, 3 or a mixture of 1, 2, and/or 3, triethanolamine when z is 1, 2, 3 or a mixture of 1, 2, and/or 3, or sucrose when z is from 1 to p, preferably from 1 to (p−1), where p is the number of free hydroxyl groups or derivatives present in said compound, and preferably wherein the number average molecular weight of the compound is at least about 1,000. Preferably n is from about 5 to about 50 and more preferably from 5 to about 20. Examples of $R^1$, $R^2$, $R^3$ and/or $R^4$ include, but are not limited to, hydrogen, methyl, ethyl, propyl, butyl, pentyl, hexyl, heptyl, octyl, nonyl, decyl, and the like.

Suitable monomeric units include hydroxybutyrate, hydroxyvalerate, hydroxyhexanoate, hydroxyheptanoate, hydroxypropanoate, hydroxyoctanoate, hydroxynonanoate, hydroxydecanoate, hydroxyundecanoate, and hydroxydodecanoate units. PHAs including monomers and polymers (homopolymers, copolymers, and the like) and derivatives of 3-hydroxyacids, 4-hydroxyacids, 5-hydroxyacids, polylactic acid, and polyglycolic acid, or combinations thereof can be used. Representative PHAs are described in Steinbüchel & Valentin, FEMS Microbiol. Lett., 128:219–28 (1995).

Preferred PHAs include, but are not limited to, polyhydroxybutyrate; a copolymer of hydroxybutyric acid and hydroxyvaleric acid (e.g., a copolymer of 1–99 weight % hydroxy butyric acid and 1–99 weight % hydroxyvaleric acid); a copolymer of 3-hydroxybutyric acid and 4-hydroxybutyric acid (e.g., a copolymer of 1–99 weight % 3-hydroxybutyric acid and 1–99 weight % 4-hydroxybutyric acid); polyhydroxyhexanoate; polyhydroxyoctanoate; a copolymer containing hydroxyhexanoate or hydroxyoctanoate groups randomly distributed through the polymer chain (e.g., at least 10% by molar mass hydroxyoctanoate groups randomly distributed through the polymer chain of a copolymer); and combinations thereof. The polyhydroxyoctanoate can also have end chain functionalities such as groups selected from vinyl; carboxylic acid; carboxylic acid ester; acetate; butyrate; propanoate; primary, secondary, or tertiary alcohol; amide; and/or a polyhydric alcohol.

The PHA can also have the formula $R^5CH=CH(CH_2)_{n-1}CO[OCHR^6(CH_2)_nCO]_pOH$. Alternatively, the PHA can have the formula $H[OCHR^7(CH_2)_nCO]_pOR'$. Further, the PHA can have the formula $R'''CO[OCHR^8(CH_2)_nCO]_pOH$. The PHA can also be a block polymer containing polyhydroxyalkanoate segments and at least one polyalkylene glycol segment. Preferably, for such a PHA, the block polymer preferably contains at least 20 weight % of a PHA segment and at least one polyalkylene glycol segment selected from one or more repeat units of ethylene oxide, propylene oxide, butylene oxide, or mixtures thereof. In the above formulas, p is from 5 to 1000, n is 0 or an integer, R' is derived from a monohydric alcohol or a polyhydric alcohol, such as methyl-styryl, and R" is derived from a carboxylic acid having 1 to 20 carbon atoms, such as methyl-styryl, $R^5$, $R^6$, $R^7$, and $R^8$ can represent saturated or unsaturated hydrocarbon radicals; halo, hydroxy, oxygen or nitrogen substituted radicals; or hydrogen atoms, such as H, CH$_3$, C$_2$H$_5$, C$_3$H$_7$, C$_4$H$_9$, or C$_5$H$_{11}$.

In another embodiment, biodegradable polyhydroxyalkanoates can have at least one of the terminal end groups selected from:

a) —CO—CH=CR$^9$R$^{10}$;
b) —OR$^{11}$;
c) —COOR$^{12}$, d) —COR$^{13}$; or e) —O$^{-M+}$ wherein R$^9$, R$^{10}$, R$^{11}$, R$^{12}$, or R$^{13}$, which are the same or different, represent saturated or unsaturated hydrocarbon radicals, halo- or hydroxy-substituted radicals, hydroxy radicals, nitrogen-substituted radicals, oxygen-substituted radicals, or a hydrogen atom, with the proviso that R$^{11}$ is not a hydrogen atom. M$^+$ is a counterion, such as, but not limited to, ammonium, and metal counterions, like sodium, potassium, zinc, calcium, and the like. Preferably, both of the terminal end groups of the PHA are selected from one of the above-described terminal end groups a)–e) wherein the terminal end groups can be the same or different. Alternatively, the PHA can have one of the above-described terminal end groups a)–e) and the other terminal end group can be hydrogen or —OH. Preferably, when the terminal end group is —OR$^{11}$, or —COR$^{13}$, the other end group is not —OH. These various terminal end groups can be the terminal end groups for the PHA formula (I) set forth and described above. These degradable polyhydroxyalkanoates can have any molecular weight such as from about 500 to about 1.5 million. More preferably, the molecular weight is from about 500 to about 100,000, more preferably from about 500 to less than 20,000, such as from about 500 to about 9,000. These polyhydroxyalkanoates can be polymers, oligomers, or monomers and are collectively referred to herein as oligomers.

Preferred PHAs useful in the compositions and methods of the present invention include the following formulae wherein the various variables are as described above.

H(OCHRCH$_2$CO)$_n$OH

H(OCHRCH$_2$CO)$_n$OR' where R' is preferably an alkyl group or substituted alkyl group (e.g. diol, polyol, etc)

H(OCHRCH$_2$CO)$_n$O$^+$M$^+$ where M$^+$ is preferably selected from ammonium, sodium, potassium, zinc, and calcium R"CO(OCHRCH$_2$CO)$_n$OH where R" is preferably the alkyl group from an aliphatic carboxylic acid R"CO(OCHRCH$_2$CO)$_n$OR' where R" is preferably the alkyl group from an aliphatic carboxylic acid and R' is preferably an alkyl group or substituted alkyl group ( e.g. diol, polyol, etc.)

R"CO(OCHRCH$_2$CO)$_n$O$^-$M$^+$ where R" is preferably the alkyl group from an aliphatic carboxylic acid and M$^+$ is preferably selected from ammonium, sodium, potassium, zinc, and calcium.

Other PHAs that are encompassed by the present invention and that can be particularly well suited for use as surface active agents include PHAs of formulae (II)–(VI) below:

Agents containing a hydrophobic X component— {OC(R)H(CH$_2$)$_n$CO}$_p$— (II)

where R is a hydrogen atom or an alkyl group having from 1 to 12 carbon atoms, n is from 0 to about 3, p is from about 1 to about 40, wherein the polymer is a homopolymer or a copolymer containing structural units of the same R group and/or the same n values or containing structural units of random mixtures of different R groups and/or different n values;

A-X-B (III)

where A and B are polyalkylene oxide units comprising ethylene oxide, propylene oxide units or mixtures of ethylene oxide and propylene oxide units in a block or a random array with the proviso that if the units are in a block array containing ethylene oxide structural units the array contains terminal ethylene oxide blocks, and wherein the total number of ethylene oxide and propylene oxide units in A and B is from about 1 to about 100, preferably from about 5 to about 40, and more preferably wherein greater than about 60% of the total repeat units are ethylene oxide units, and X is the X component shown in formula (II) above;

C-X-D (IV)

where C is a polyalkylene oxide unit comprising ethylene oxide structural units, propylene oxide structural units, or mixtures of ethylene oxide and propylene oxide structural units in a block or a random array with the proviso that if the array is a block array containing ethylene oxide structural units the array contains terminal ethylene oxide blocks, and wherein the total number of ethylene oxide and propylene oxide structural units in C is from about 1 to about 100, preferably from about 5 to about 40, and more preferably wherein greater than about 60% of the total repeat units are ethylene oxide units, X is the X component shown in formula (II) above, and D is an alkyl ester having from about 1 to about 20 carbon atoms or OM where M is hydrogen, sodium, potassium, or ammonium;

E-X-F (V)

where E is a carboxylate structural unit wherein the alkyl group of the carboxylic structural unit contains from about 1 to about 19 carbon atoms, X is the X component shown in formula (II) above, and F is selected from a polyalkylene oxide structural unit containing ethylene oxide structural units, propylene oxide structural units, or a mixture of ethylene oxide and propylene oxide structural units in a block array or a random array with the proviso that if the array is a block array containing ethylene oxide structural units the array contains terminal ethylene oxide blocks, and wherein the total number of ethylene oxide and propylene oxide structural units in F is from about 1 to about 100, more preferably from about 5 to about 40, and more preferably wherein greater than about 60% of the total repeat units are ethylene oxide units, —OCH$_2$CH$_2$N(R')$_2$ where R' is hydrogen or an ethylene oxide unit containing from about 1 to about 20 repeat units, —N(CH$_2$CH$_2$OR")R'" where each of R" and R'" is independently a hydrogen atom or an ethylene oxide structural unit containing from about 1 unit to about 20 repeating units, —OCH$_2$CH$_2$N(CH$_2$CH$_2$OR"") where R"" is either a hydrogen atom or an ethylene oxide structural unit containing from about 1 unit to about 20 repeating units, or a polyol that may be subsequently ethoxylated, wherein the polyol is selected from glycerol, trimethylol propane, or sucrose; or

G-X-H (VI)

where X is the X component shown in formula (II) above, G is selected from a polyalkylene oxide structural unit containing ethylene oxide structural units, propylene oxide structural units, or a mixture of ethylene oxide and propylene oxide structural units in a block array or a random array with the proviso that if the array is a block array containing ethylene oxide structural units the array contains terminal ethylene oxide blocks, and wherein the total number of ethylene oxide and propylene oxide structural units in G is from about 1 to about 100, more preferably from about 5 to about 40, and more preferably wherein greater than about 60% of the total repeat units are ethylene oxide units, and and H is selected from a polyalkylene oxide structural unit containing ethylene oxide structural units, propylene oxide structural units, or a mixture of ethylene oxide and propylene oxide structural units in a block array or a random array with the proviso that if the array is a block array containing ethylene oxide structural units the array contains terminal ethylene oxide blocks, and wherein the total number of ethylene oxide and propylene oxide structural units in H is from about 1 to about 100, more preferably from about 5 to about 40, and more preferably wherein greater than about 60% of the total repeat units are ethylene oxide units, —$OCH_2CH_2N(R')_2$ where R' is hydrogen or an ethylene oxide unit containing from about 1 to about 20 repeat units, —$N(CH_2CH_2OR'')R'''$ where each of R'' and R''' is independently a hydrogen atom or an ethylene oxide structural unit containing from about 1 unit to about 20 repeating units, —$OCH_2CH_2N(CH_2CH_2OR'''')$ where R'''' is either a hydrogen atom or an ethylene oxide structural unit containing from about 1 unit to about 20 repeating units, or a polyol that may be subsequently ethoxylated, wherein the polyol is selected from glycerol, trimethylol propane, or sucrose.

The present invention also relates to a group of alkanoic acid ester oligomers having a number average molecular weight of greater than about 1000 and having one or more of the following formulae:

  (VII)

wherein R represents a hydrogen atom or an alkyl group having from about 1 to about 18 carbon atoms, R' represents a hydrogen atom or an acetate group, n is from about 1 to about 3, and m is from about 1 to about 3;

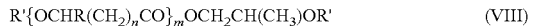  (VIII)

wherein R represents a hydrogen atom or an alkyl group having from about 1 to about 18 carbon atoms, R' is a hydrogen atom or an acetate group, n is from about 1 to about 3, and m is from about 1 to about 3; or

  (IX)

wherein R represents a hydrogen atom or an alkyl group having from about 1 to about 18 carbon atoms, R' represents a hydrogen atom or an acetate group, R'' represents a hydrogen atom or an alkyl group having from about 1 to about 10 carbon atoms, n is from about 1 to about 3, m is from about 1 to about 3, and said oligomer has the following Hansen solubility parameters:

dispersive—from about 16 to about 22, polar—from about 3 to about 12, and hydrogen—from about 6 to about 17.

In particular, the alkanoic acid ester oligomers of formulae (VII)–(IX) are well suited as solvents and are preferably biodegradable. The present invention also provides solutions that include a solute dissolved in or mixed with an alkanoic acid ester oligomer of formula (VII), (VIII) or (IX).

The present invention also relates to a group of alkanoic acid ester oligomers having a number average molecular weight of greater than about 1,000 and having one or more of the following formulae:

  (X)

wherein R represents a hydrogen atom or an alkyl group having from about 1 to about 18 carbon atoms, R' represents a hydrogen atom or an acetate group, R'' is a hydrogen atom or and alkyl group having from about 1 to about 18 carbon atoms; n is from about 1 to about 3, m is from about 1 to about 30, and p is from about 1 to about 100;

  (XI)

wherein R represents a hydrogen atom or an alkyl group having from about 1 to about 18 carbon atoms, R' is a hydrogen atom or an acetate group, R'' represents a hydrogen atom or a methyl group, n is from about 1 to about 3, and m is from about 1 to about 30, and q is from about 1 to about 100; or

  (XII)

wherein R represents a hydrogen atom or an alkyl group having from about 1 to about 18 carbon atoms, R' represents a hydrogen atom or a methyl group, R'' represents a hydrogen atom or an alkyl group having from about 1 to about 18 carbon atoms, n is from about 1 to about 3, m is from about 1 to about 30, p is from about 1 to about 100, and q is from about 1 to about 100.

In particular, the alkanoic acid ester oligomers of formulae (X)–(XII) are well suited as surface active agents and are preferably biodegradable. The present invention also provides solutions or liquid mixtures that include an alkanoic acid ester oligomer surface active agent of formula (X), (XI) or (XII).

The PHAs can be synthetically prepared or prepared from a biological source such as a microorganism which naturally produces the PHAs or which can be induced to produce the PHAs by manipulation of culture conditions and feedstocks, or prepared from microorganisms or a higher organism such as a plant, which has been genetically engineered so that it produces PHAs.

Methods which can be used for producing PHA polymers from microorganisms which naturally produce polyhydroxyalkanoates are described in U.S. Pat. No. 4,910,145 to Holmes, et al.; Byrom, "Miscellaneous Biomaterials" in Biomaterials (Byrom, ed.) pp. 333–59 (MacMillan Publishers, London 1991); Hocking and Marchessault, "Biopolyesters" in Chemistry and Technology of Biodegradable Polymers (Griffin, ed.) pp. 48–96 (Chapman & Hall, London 1994); Holmes, "Biologically Produced (R)-3-hydroxyalkanoate Polymers and Copolymers" in Developments in Crystalline Polymers (Bassett, ed.) vol. 2, pp. 1–65 (Elsevier, London 1988); Lafferty et al., "Microbial Production of Poly-b-hydroxybutyric acid" in Biotechnology (Rehm & Reed, eds.) vol. 66, pp. 135–76 (Verlagsgesellschaft, Weinheim 1988); Müller & Seebach, Angew. Chem. Int. Ed. Engl. 32:477–502 (1993).

Methods for producing PHAs in natural or genetically engineered organisms are described by Steinbütichel, "Polyhydroxyalkanoic Acids" in Biomaterials (Byrom, ed.) pp. 123–213 (MacMillan Publishers, London 1991); Williams & Peoples, CHEMTECH, 26:3844–44 (1996); Steinbüchel & Wiese, Appl. Microbiol. Biotechnol., 37:691–97 (1992); U.S. Pat. Nos. 5,245,023; 5,250,430; 5,480,794; 5,512,669;

5,534,432 to Peoples and Sinskey; Agostini et al., Polym. Sci., Part A-1, 9:2775–87 (1971); Gross et al., Macromolecules, 21:2657–68 (1988); Dubois, et al., Macromolecules, 26:4407–12 (1993); Le Borgne & Spassky, Polymer, 30:2312–19 (1989); Tanahashi & Doi, Macromolecules, 24:5732–33 (1991); Hori et al., Macromolecules, 26:4388–90 (1993); Kemnitzer et al., Macromolecules, 26:1221–29 (1993); Hori et al., Macromolecules, 26:5533–34 (1993); Hocking & Marchessault, Polym. Bull., 30:163–70 (1993); Xie et al., Macromolecules, 30:6997–98 (1997); and U.S. Pat. No. 5,563,239 to Hubbs et al. Other polymer synthesis approaches including direct condensation and ring-opening polymerization of the corresponding lactones are described in Jesudason & Marchessault, Macromolecules 27:2595–602 (1994); U.S. Pat. No. 5,286,842 to Kimura; U.S. Pat. No. 5,563,239 to Hubbs et al.; U.S. Pat. No. 5,516,883 to Hori et al.; U.S. Pat. No. 5,461,139 to Gonda et al.; and Canadian Patent Application No. 2,006,508. WO 95/15260 describes the manufacture of PHBV films, and U.S. Pat. Nos. 4,826,493 and 4,880,592 to Martini et al. describe the manufacture of PHB and PHBV films. U.S. Pat. No. 5,292,860 to Shiotani et al. describes the manufacture of the PHA copolymer poly(3-hydroxybutyrate-co-3-hydroxyhexanoate).

The low molecular weight PHAs can be prepared, for instance, by first using a PHA of a higher number average molecular weight such as greater than 80,000, for example, greater than 200,000 or greater than 500,000. This PHA having the higher molecular weight can then be subjected to an acid hydrolysis which will result in a lower molecular weight PHA. The acid hydrolysis preferably occurs in the presence of an alcohol, a diol, or a polyhydric alcohol, or combinations thereof. The preferred conditions for the acid hydrolysis and the preferred amounts of the components in this reaction which reduces the molecular weight of the PHA are as follows. The acid hydrolysis of the PHA can be done in the presence of alcohol, diol, or polyols. When an excess amount of alcohol, diol, or polyol is used, the PHA will result in a low molecular weight PHA, such as an oligomer, with hydroxyl groups in both terminal positions. The reaction conditions are controlled such that preferably at least 1% by weight residual alcohol, diol, or polyol remains in the reaction product. For example, the controlled hydrolysis of polyhydroxybutyrate in the presence of ethylene glycol or 1,4 butane diol produces oligomers with the structure:

For ethylene glycol:
H(—OCH(CH$_3$)CH$_2$CO)$_n$OCH$_2$CH$_2$OH;
and for 1, 4 butane diol:
H(O—CH(CH$_3$)CH$_2$CO)$_n$OCH$_2$CH$_2$CH$_2$CH$_2$OH;
wherein n is preferably from about 2 to about 50.

If an excess of an alcohol is used in the hydrolysis process then a hydroxy ester is obtained, which for polyhydroxybutyrate in the presence of methanol, would have the structure:
H—(OCH(CH$_3$)CH$_2$CO)$_n$OCH$_3$.

The hydrolysis of polyhydroxyalkanoates can occur in the presence of a strong acid catalyst such as sulfuric acid, hydrochloric acid or phosphoric acid; the most preferable being sulfuric or hydrochloric acids. The resultant oligomers contain a terminal hydroxyl and carboxylic acid groups. If the reaction is carried out in the presence of a strong acid catalyst and an alcohol, then the oligomers will have terminal hydroxyl and ester groups. If the reaction is carried out in the presence of a strong acid catalyst and a carboxylic acid, then the oligomers will have an ester group generated from the carboxylic acid and the hydroxyl group on the oligomers, and a free carboxylic acid.

While the acid hydrolysis reaction can occur under ambient temperatures, elevated temperatures are normally utilized to increase the reaction rate. For the acid hydrolysis of polyhydroxyalkanoates, the most preferable reaction temperature conditions are from about 70° C. to about 140° C. In an embodiment of the present invention, acid hydrolysis reactions occurring above 140° C. typically have a mixture of terminal hydroxyl and vinyl groups as well as the free acid or ester group.

The low molecular weight PHA can also be prepared by the thermolysis of a higher molecular weight PHA such as one having a molecular weight of greater than about 80,000. The thermolysis conditions can be as follows. Alkenoic acid oligomers can be obtained in high yield by the thermal treatment of polyhydroxyalkanoates at sufficient temperatures, such as from about 160° C. to about 250° C. at atmospheric pressure for a sufficient period, such as from about 1 minute to about 4 hours.

Where the polyhydroxyalkanoate produced microbially is a copolymer then a mixture of alkenoic acids are generated under the described thermal treatment. These may be separated into their individual alkenoic acid or ester derivatives by conventional fractional distillation either under ambient conditions or vacuum.

When the thermal treatment is carried out under vacuum then the predominant yield is changed to a mixture of dimer, trimer and/or tetramer of the alkenoic acid. Further, if the temperature is reduced to 180° C. to 220° C., then oligomeric species having terminal vinyl and carboxylic acid groups can be obtained; the molecular weight being controlled by the residence time at this temperature. These oligomers have the generic structure: RCH=CH(CH$_2$)$_n$CO[OCHR(CH$_2$)$_n$CO]$_m$OH where n=1 to 8, R represents an alkyl group having from 1 to 18 carbon atoms, and m=0 to 100.

While crotonic acid has previously been used as a comonomer in bulk, solution, and emulsion polymerization processes, higher alkenoic acid derivatives have not been used. Higher alkyl substituted 2 alkenoic acids offer an acid functionality in a similar manner to acrylic, methacrylic, and crotonic acids, however they are expected to offer increased hydrophobicity from the longer alkyl chain. Free radical generated polymers containing these higher alkenoic acid monomers preferably lead to increased water resistance, scrub resistance, and/or low surface free energy than those containing crotonic acid. The alkyl group would be expected to have an impact on the glass transition temperature of the resultant polymer; as the number of carbon atoms in the alkyl chain increases, then the glass transition temperature (Tg) of the polymer will decrease. Hence these higher alkenoic acids derivatives can produce dual functionality, i.e., adhesion or crosslinking through the acid/ester group and hydrophobicity/Tg reduction through the alkyl group.

Other manners in which the lower molecular weight PHAs can be obtained include, but are not limited to, synthetic polymerization by such methods as condensation of the hydroxy acids.

A number of features of the polyhydroxyalkanoate polymers make them particularly attractive in compositions such as hot melt adhesives, reactive hot melt adhesives, biodegradable waxes, and coatings for food products. The PHA compositions can be prepared using PHAs in their solid form, in a latex form, in aqueous dispersions, or in solution, for example, dissolved in a solvent such as acetone. PHAs can be plasticized and blended with other polymers or agents.

A variety of PHAs, having a wide range of polymer physical properties, can be produced, depending on the hydroxyacid monomer composition used (Steinbuchel & Valentin, FEMS Microbiol. Lett., 128:219–28 (1995)). The range of properties include, for example, melting temperatures between about 40° C. and 180° C., glass transition temperatures between about −55° C. to 5° C., degrees of crystallinity between about 0% and 80%, and elongation to break between about 5 and 500%. The rate of crystallization can be controlled. Polyhydroxybutyrate, for example, has characteristics similar to those of polypropylene, while polyhydroxyoctanoates (a copolymer of D-3-hydroxyoctanoate and D-3-hydroxyhexanoate) and poly-D-4-hydroxybutyrate behave more as elastomers, and PHAs with longer side chains have characteristics similar to waxes. The range of PHA polymers available with melting temperatures ranging from about 40° C. to about 180° C. provides additional flexibility in shape formation. As the molecular weight is reduced, the Tg remains relatively constant however the Tm is reduced. At low molecular weights (<50,000), the end chain units start to have an impact on physical properties.

PHAs can exist in at least two distinct physical forms, as amorphous granules or as crystalline solids. The tendency of the PHAs to crystallize in terms of both final degree of crystallinity and rates of crystallization also varies with composition. PHA polymers offering rapid crystallization can be used for high green strength. These would include, for example PHB and PHBV, with the latter copolymer exhibiting the unique feature of isodimorphism. Where higher malleability is desired, PHOs and other longer pendant group types could be used. This polymer class has a lower glass transition temperature, around −35° C. as compared to 5° C. for the PHB homopolymer, allowing them to be formulated as self lubricating. This in turn reduces the need for other additives to obtain suitable flow characteristics for the mixture fed to the shaping system.

One particularly useful form is as a latex of PHA in water. Evaporation of the water as the shapes are molded results in film formation as the PHA granules coalesce providing excellent binding. The PHAs are readily removed by degradation during the subsequent thermal processing of the shaped parts. The range of PHA polymers available with melting temperatures ranging from about 40° C. to about 180° C. provides additional flexibility in shape formation.

The monomer compositions can also affect solubility in organic solvents, allowing the choice of a wide range of solvents. Copolymers of D-3-hydroxybutyrate and other hydroxyacid co-monomers have significantly different solubility characteristics from those of the PHB homopolymer. For example, acetone is not a good solvent for PHB but is very useful for dissolving D-3-hydroxybutyrate copolymers with D-3-hydroxyacids containing from 6 to 12 carbon atoms (Abe et al., Int. J. Biol. Macromol. 16:115–19 (1994); Kato et al., Appl. Microbiol. Biotechnol., 45:363–70 (1996)). Mitomo et al., Reports on Progress in Polymer Physics in Japan, 37:128–29 (1994), describes the solubility of copolyesters poly(3-hydroxybutyrate-co-4-hydroxybutyrate, containing from 15 to 75 mol. % 4-hydroxybutyrate residues, in acetone. A number of other solvents suitable for a range of PHAs are described in U.S. Pat. No. 5,213,976 to Blauhut et al.; U.S. Pat. No. 4,968,611 to Traussnig; Japan Kokai Tokkyo Koho JP 95,135,985; Japan Kokai Tokkyo Koho JP 95,79,788; WO 93/23554; DE 19533459; WO 97/08931; and Brazil Pedido PI BR 93 02,312.

PHAs can be plasticized and blended with other polymers or agents. Other, non-microbial, polymers having structures and decomposition temperatures similar to polyhydroxyalkanoates include polylactide (PLA) and polyglycolide (PGA). These polymers can be used in combination with or in place of PHA binders. The production and use of PLA are described extensively by Kharas et al., "Polymers of Lactic Acid" in Plast. Microbes (Mobley, ed.) pp. 93–137 (Hanser, Munich, Germany (1994)). The ester oxygens of these polymers, PHAs, PLA, PGA, are polar and provide good bonding with other compositional components.

In the case of PHAs containing unsaturated monomers, the alkenoic acids can be destroyed by thermal catalytic systems, by combustion, or a combination thereof. The need for air inflow, oxygen, or other oxidants is eliminated or reduced through the use of PHA binders, thereby reducing waste gas emissions and heat loss. Avoidance of oxidants also minimizes undesirable oxidation of components such as metal powders. PHAs are also compatible with a reducing or inert atmosphere, when exposure to such atmospheres is desired. For example, the use of reducing atmospheres is advantageous when using metal oxides or mixtures comprising metal oxides.

In general, avoidance of the need for protective atmospheres or other gases simplifies the process and protects the constituent materials. The rate of decomposition of the PHA can be controlled more easily than the combustion of other binding materials. Combustion requires diffusion of combustion product from the burning binder and diffusion of oxygen to it entail process control and other complexities that are obviated by the use of the PHA system. In other words, the unpredictable results of combustion are avoided since oxygen penetration into the powder-containing shape is no longer required. The PHA system also avoids carbon residues found in other binder systems containing polyolefin or polystyrene materials, thereby leading to fewer faults and greater strength in the final products.

PHAs may also be removed using a solvent process. A variety of application and processing options are provided, since a range of solvents for PHAs are available. The solvency characteristic of PHAs also allows for their removal from malformed compacts, unused tape, and other process waste, thereby reducing wastage. In addition, the PHAs are made from renewable resources and degradable by enzymatic action produced by microorganisms in, for example, composting systems, providing another means of disposal of waste material.

The hot melt adhesive compositions of the present invention can include at least one of the low molecular weight polyhydroxyalkanoates described above, at least one of the terminally-modified polyhydroxyalkanoates described above, or both. In addition, the hot melt adhesive compositions of the present invention may also include other components such as a reactive monomer component, a wax component, a tackifier, and other additives. Preferably, the hot melt adhesive compositions of the present invention have a viscosity of less than about 100,000 centipoise at 150° C., more preferably less than about 5,000 centipoise at 150° C. Preferably, the hot melt adhesive compositions of the present invention have a glass transition temperature and a melt viscosity that together provide a softening point of from about 25° C. to about 200° C., more preferably, from about 50° C. to about 150° C., for example, from about 85° C. to about 115° C.

If a reactive monomer is included in the hot melt adhesive composition of the present invention, the reactive monomer is preferably compatible with the polyhydroxyalkanoate and the other components in the composition. Preferably, the reactive monomer is capable of remaining reactive under normal processing conditions and preferably reacts after the composition is heated to an adhesive application temperature, for example, a temperature of from about 80° C. to about 200° C. Reactive monomers and resins that can be used include epoxy monomers including novolac epoxy monomers and bisphenol A epoxy monomers, acrylate monomers, methacrylate monomers, silicone monomers, siloxane monomers, silane monomers, isocyanate monomers, urethane monomers, anhydride monomers, oximes, and combinations thereof.

Hot melt adhesives according to the present invention that are designed for moisture curing preferably include polyhydroxyalkanoates that are isocyanate-terminated and/or silane terminated. Hot melt adhesives according to the present invention that are designed for radiation curing, such as ultraviolet radiation curing or gamma radiation curing, and/or peroxide curing, preferably include polyhydroxyalkanoates that are vinyl-terminated. Modifying polyhydroxyalkanoates to include such reactive terminal groups can be accomplished in a manner as described in U.S. Pat. Nos. 4,985,535; 5,583,187; 5,753,765; 5,900,473; 5,939,488; 5,939,499; and 5,952,405; all incorporated herein in their entireties by reference.

According to an embodiment of the present invention, a reactive resin can be included in the hot melt adhesive composition, preferably a reactive resin that is solid at room temperature (25° C.), such as a solid epoxy or epoxide resin, a solid polyamine resin, combinations thereof, and the like. Preferably, if a solid reactive resin is used, the resin is combined in a fine powdered form with the polyhydroxyalkanoate. Preferably, the powdered reactive material does not cross-link at room temperature but does cross-link with itself or with the polyhydroxyalkanoate at the application or curing temperature of the hot melt adhesive composition. Preferably, if a solid resin is used, it is solid at room temperature and has a melting point that is about the same as or slightly above the application temperature for the hot melt adhesive composition.

According to embodiments of the present invention, the polyhydroxyalkanoates can be modified to include a terminal reactive group such as one or more of the reactive groups mentioned above.

The reactive monomer can be included in the hot melt adhesive compositions of the present invention in an amount of from about 5 wt % to about 95 wt %, more preferably from about 35 wt % to about 55 wt %, based on the total weight of the adhesive composition.

If a wax component is included in the hot melt adhesive composition, the wax component can be selected from paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes.

Exemplary high density low molecular weight polyethylene waxes include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm³, and a melting point of approximately 126° C.

The paraffin waxes useful herein are those having a ring and ball softening point of about 55° C. to about 85° C. Preferred paraffin waxes are Okerin® 236 TP available from Astor Wax Corporation located in Doraville, Ga.; Penreco® 4913 available from Pennzoil Products Co. in Houston, Tex.; R-7152 Paraffin Wax available from Moore & Munger in Shelton, Conn.; and Paraffin Wax 1297 available from International Waxes, Ltd in Ontario, Canada.

Other paraffinic waxes include waxes available from CP Hall under the product designations 1230, 1236, 1240, 1245, 1246, 1255, 1260, & 1262. CP Hall 1246 paraffinic wax is available from CP Hall (Stow, Ohio). CP Hall 1246 paraffinic wax has a melting point of 143° F. (62° C.), a viscosity at 210° F. (99° C.) of 4.2 centipoise (0.042 grams/(cm.second)), and a specific gravity at 73° F. (23° C.) of 0.915 g/cm³.

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melting point wax available from Bareco in Chicago, Ill.; Okerin® 177, an 80° C. melting point wax available from Astor Wax Corp.; Besquare® 175 and 195 Amber Waxes and 80° C. and 90° C. melting point microcrystalline waxes both available from Petrolite Corp. in Tulsa, Okla.; Indramic® 91, a 90° C. melting point wax available from Industrial Raw Materials located in Smethport, Pa.; and Petrowax® 9508 Light, a 90° C. melting point wax available from Petrowax Pa., Inc. located in New York, N.Y.

The synthetic high melting point (HMP) waxes useful herein are high density, low molecular weight polyethylene waxes, by-product polyethylene waxes and Fischer-Tropsch waxes. Preferred waxes include Petrolite® C-4040, Polywax® 1000, 2000 and 3000, low molecular weight polyethylene waxes available from Petrolite Corp.; Escomer® H-101, a modified polyethylene wax available from Exxon Chemical Co.; Marcus® 100, 200 and 300, low molecular weight by-product polyethylene waxes available from Marcu Chemical Co., a Division of H.R.D. Corp. located in Houston, Tex.; Paraflint® H-1, H-4 and H-8, Fischer-Tropsch waxes available from Sasol-SA/Moore & Munger in Shelton, Conn.; and Petrolite® PX-100, a Fischer-Tropsch wax available from Bareco.

Other waxes that can be useful according to embodiments of the present invention include polypropylene waxes, ethylene vinyl acetate waxes, oxidized polyethylene waxes, ethylene acrylate waxes, and other waxes available from Hoechst Celanese and Eastman Chemical.

Preferred waxes, particularly when it is desired to prepare the hot melt adhesives of the invention in a dual reactor scheme, will be homogeneous waxes prepared using a constrained geometry or single site catalyst and using the procedures such as are set forth above and in the Examples below. Such polymers will be either ethylene homopolymers or interpolymers of ethylene and a comonomer which is a C3–C20 α-olefin, styrene, alkyl-substituted styrene, tetrafluoroethylene, vinylbenzocyclobutane, non-conjugated diene, or naphthenic, preferably a C4–C20 α-olefin or styrene, and more preferably, a C6–C20 α-olefin.

The homogeneous wax will have a melt viscosity at 350° F. such as to yield the desired overall viscosity and close time of the hot melt adhesive formulation. Typically, the homogeneous wax will have a melt viscosity at 350° F. (177° C.) of no more than 1000 centipoise (10 grams/(cm.second)), preferably no more than 800 centipoise (8 grams/(cm.second)), with homogeneous waxes having a melt viscosity at 350° F. (177° C.) of no more than 500 centipoise (5 grams/(cm.second)) being useful. The homogeneous wax will typically have a melt viscosity at 350° F. (177° C.) of at least 100 centipoise (1 grams/(cm.second)), typically at least 120 centipoise (1.2 grams/(cm.second)), more typically at least 150 centipoise (1.5 grams/cm.second), with waxes having a melt viscosity at 350° F. (177° C.) of at least 200 centipoise (2 grams/(cm.second)) being particularly preferred from the standpoint of process economics.

Such polymers, in contrast to traditional waxes, will preferably have a Mw/Mn of from 1.5 to 2.5, preferably from 1.8 to 2.2.

The homogeneous wax will have a density of at least 0.885 g/cm$^3$, preferably at least 0.900 g/cm$^3$, more preferably at least 0.920 g/cm$^3$. The homogeneous wax will have a density of no more than 0.970 g/cm$^3$, preferably no more than 0.965 g/cm$^3$, more preferably no more than 0.940 g/cm$^3$.

Particularly in the case of hot melt adhesives formulated to be applied at temperatures of less than 150° C., the waxes are useful in amounts from 0 percent to 40 percent by weight in the adhesive, preferably from 15 percent to 35 percent by weight in the adhesive and most preferably from 20 percent to 30 percent by weight in the adhesive, and may be used in any combination. However, waxes are useful to modify the rate of set, lower the viscosity, increase the heat resistance and improve machine ability of the finished adhesive. Thus, the amount and type of wax used will be determined based on those factors.

The waxes mentioned above can also be combined with the polyhydroxyalkanoates of the present invention to provide biodegradable wax compositions according to the present invention, which are useful in many fields including protective films, layers and coatings for products such as food products, as described in more detail below.

As used herein, the term "tackifier" means any of several hydrocarbon based compositions useful to impart tack to the hot melt adhesive composition. For instance, several classes of tackifiers include aliphatic C5 resins, polyterpene resins, hydrogenated resins, mixed aliphatic-aromatic resins, rosin esters, and hydrogenated rosin esters.

Exemplary tackifying resins useful herein include aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise (20 grams/cm.second). They are also available with differing levels of hydrogenation, or saturation, which is another commonly used term. Useful examples include Eastotac® H-100, H-115 and H-130 from Eastman Chemical Co. in Kingsport, Tenn., which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac® H-142R from Eastman Chemical Co. has a softening point of about 140° C. Other useful tackifying resins include Escorez® 5300 and 5400, partially hydrogenated cycloaliphatic petroleum hydrocarbon resins, and Escorez® 5600, a partially hydrogenated aromatic modified petroleum hydrocarbon resin all available from Exxon Chemical Co. in Houston, Tex.; Wingtack® Extra which is an aliphatic, aromatic petroleum hydrocarbon resin available from Goodyear Chemical Co. in Akron, Ohio; Hercolite® 2100, a partially hydrogenated cycloaliphatic petroleum hydrocarbon resin available from Hercules, Inc. in Wilmington, Del.; and Zonatac® 105 and 501 Lite, which are styrenated terpene resins made from d-limonene and available from Arizona Chemical Co. in Panama City, Fla.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac® 1103, a pentaerythritol rosin ester available from Arizona Chemical Co., Unitac® R-100 Lite, a pentaerythritol rosin ester from Union Camp in Wayne, N.J., Permalyn® 305, a erythritol modified wood rosin available from Hercules and Foral 105 which is a highly hydrogenated pentaerythritol rosin ester also available from Hercules. Sylvatac® R-85 and 295 are 85° C. and 95° C. melt point rosin acids available from Arizona Chemical Co. and Foral AX is a 7020 C. melt point hydrogenated rosin acid available from Hercules, Inc. Nirez V-2040 is a phenolic modified terpene resin available from Arizona Chemical Co.

Other tackifiers that can be used according to embodiments of the present invention include alpha-methylstyrene resins and hydrogenated hydrocarbon resins that can contain aliphatic or aromatic hydrocarbons, for example, resins of these types available from Hercules, Inc.

Another exemplary tackifier that can be used according to the present invention is Piccotac 115, which has a viscosity at 350° F. (177° C.) of about 1600 centipoise (16 grams/(cm.second)). Other typical tackifiers have viscosities at 350° F. (177° C.) of much less than 1600 centipoise (16 grams/(cm.second)), for instance, from 50 to 300 centipoise (0.5 to 3 grams/(cm.second)).

Exemplary aliphatic resins include those available under the trade designations Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™ M, Marukarez™, Arkon™ M, Quintone™, etc. Other tackifiers may be employed, provided they are compatible with the homogeneous linear or substantially linear ethylene/α-olefin interpolymer and the wax.

In certain embodiments, the hot melt adhesive is prepared without the use of a tackifier or with a minimal quantity of tackifier. As tackifiers are malodorous, tend to cause corrosion of mechanical equipment, and cannot be easily separated from recycled paper pulp, hot melt adhesives which minimize the use of tackifiers are advantageous. Moreover, as tackifiers generally undergo degradation at elevated temperatures, hot melt adhesives which minimize the use of tackifiers exhibit improved thermal stability. Hot melt adhesives having less than about 20 weight percent tackifier, preferably less than about 15 weight percent tackifier and more preferably less than about 10 weight percent tackifier, are preferred when preparing the hot melt adhesive in a dual reactor configuration.

However, particularly for the hot melt adhesives of the invention which are suitable for use at low application temperatures, the adhesive of the present invention contains tackifying resins present in an amount from about 10 percent to about 60 percent by weight in the adhesive, preferably from about 20 to about 55 percent by weight in the adhesive, more preferably from about 25 percent to about 50 percent by weight in the adhesive, and most preferably from about 30 percent to about 45 percent by weight in the adhesive.

Additives such as antioxidants (e.g., hindered phenolics (e.g., Irgano™ 1010, Irganox™ 1076), phosphites (e.g., Irgafos™ 168)), antiblock additives, pigments dyes, fluorescing agents, and fillers, can also be included in the modified formulations, to the extent that they do not interfere with the enhanced formulation properties.

Stabilizer and antioxidants can be added to protect the adhesive from degradation caused by reactions with oxygen which are induced by such things as heat, light, or residual catalyst from the raw materials. Lowering the temperature of application as in the present invention also helps to reduce degradation. Such antioxidants are commercially available from Ciba-Geigy located in Hawthorn, N.Y. and include Irganox® 565, 1010 and 1076 which are hindered phenolic antioxidants. These are primary antioxidants which act as free radical scavengers and may be used alone or in combination with other antioxidants such as phosphite antioxidants like Irgafos® 168 available from Ciba-Geigy. Phosphite antioxidants are considered secondary antioxidants, are not generally used alone, and are primarily used as peroxide decomposers. Other available antioxidants are Cyanox® LTDP available from Cytec Industries in Stamford, Conn. and Ethanox® 1330 available from Albemarle Corp. in Baton Rouge, La. Many other antioxidants are available for use by themselves, or in combination with other such antioxidants. When employed, the antioxidant is typically present in an amount less than about 0.5 weight percent, preferably less than about 0.2 weight percent, based on the total weight of the hot melt adhesive.

The hot melt adhesive may further contain an oil. Oils are typically present to reduce the viscosity of the hot melt adhesive. When present, oils are preferably present in an amount less than about 15 wt %, preferably less than about 10 wt %, and more preferably less than about 5 wt %, based on the weight of the hot melt adhesive. Exemplary classes of oils include white mineral oil (such as Kaydol™ oil (available from Witco), and Shellflex™ 371 naphlithenic oil (available from Shell Oil Company). To the extent that the oil decreases the adhesion character of the hot melt adhesive to levels detrimental for the contemplated use, it should not be used.

The hot melt adhesives of the invention may be prepared by standard melt blending procedures. In particular, the homogeneous linear or substantially linear ethylene polymer, wax, and optional tackifier(s) may be melt blended at an elevated temperature (from 150 to 200° C.) under an inert gas blanket until a homogeneous mix is obtained. Any mixing method producing a homogeneous blend without degrading the hot melt components is satisfactory, such as through the use of a heated vessel equipped with a stirrer.

Further, the first polymer(s), wax(s), and the optional tackifier(s) may be used with an extrusion coater for application to the substrate. In the alternative, when the wax is a homogeneous wax, as described herein, it is preferred to prepare the hot melt adhesives using a dual reactor configuration, with one of the homogeneous linear or substantially linear ethylene polymer or wax being produced in the first reactor, the other of the homogeneous linear or substantially linear ethylene polymer or wax being produced in a second reactor, and a tackifier optionally provided, typically at a point after the second reactor, via a side-arm extruder. It is noted that the reactors may be operated in series or in parallel. In conjunction with the process of the invention, hot melt adhesives can be provided in forms such as pellets, pillows, or any other desired configuration. Examples of such a process which may be adapted in accordance with the teachings of this disclosure to prepare blends of a homogenous linear (higher molecular weight or ultra-low molecular weight) or substantially linear ethylene/α-olefin interpolymer, wax, and optional tackifier, are disclosed in WO 94/00500 and WO 94/01052.

The resultant adhesives preferably have Brookfield™ viscosities of less than about 5,000 cps (50 grams/(cm.second)) at 150° C., preferably less than about 3,500 cps (35 grams/(cm.second)) at about 150° C. and most preferably less than about 2,000 cps (20 grams/(cm.second)) at about 150° C. making them ideally suited for application temperatures of less than about 150° C., and preferably from about 135° C. to about 150° C. on extrusion type packaging equipment, such as those manufactured by Nordson Corp. of Atlanta, Ga. Mercer Corp., Slautterback Corp. and ITW also manufacture extrusion type packaging equipment. In addition, the hot melt adhesives of the present invention can be used for hot melt spray spray applications.

The hot melt adhesives of the present invention are further preferably characterized by excellent heat resistance and excellent flexibility. The 100 gram peel values are an illustration of the heat resistance of the adhesive composition. The peel values (PAFT) are preferably greater than about 40° C., more preferably greater than about 50° C. and most preferably greater than about 60° C. High heat resistance in combination with good cold temperature properties is a significant improvement in the state of the art for low temperature packaging adhesives.

These hot melt adhesives are ideally suited for use in the packaging industry for case and carton sealing and for tray forming. These packages may be manufactured from materials such as virgin and recycled kraft, high and low density kraft, chipboard and various types of treated and coated kraft and chipboard, and corrugated versions of these materials. These adhesives may also bond composite materials such as those types of packages used for packaging of alcoholic beverages. These composite materials may include chipboard laminated with an aluminum foil which is further laminated to film materials such as polyethylene, mylar, polypropylene, polyvinylidene chloride, ethylene vinyl acetate and various other types of films. Such film materials may also be bonded directly to chipboard or kraft in the absence of aluminum foil. One of ordinary skill in the art would recognize that a variety of substrates are used in the packaging industry to which the hot melt adhesives of the present invention may adhere.

The present invention also provides wax compositions containing the terminally-modified or low molecular weight polyhydroxyalkanoates. The wax compositions include a polyhydroxyalkanoate selected from: biodegradable polyhydroxyalkanoates having a molecular weight of from about 500 to less than 50,000; and biodegradable polyhydroxyalkanoates having at least one of the terminal end groups selected from:

a) $—CO—CH=CR^9R^{10}$;

b) $—OR^{11}$;

c) —COOR$^{12}$,
d) —COR$^{13}$; or
e) —O$^-$M$^+$ wherein R$^9$, R$^{10}$, R$^{12}$, R$^{13}$, or which are the same or different, represents saturated or unsaturated hydrocarbon radicals, halo- or hydroxy-substituted radicals, hydroxy radicals, nitrogen-substituted radicals, oxygen-substituted radicals, or a hydrogen atom, with the proviso that R$^{11}$ is not a hydrogen atom, and M$^+$ is a counterion. Preferably, the wax composition exhibits at least one of the following properties typically of waxes: a crystalline to microcrystalline structure; a capacity to acquire gloss when rubbed; a capacity to produce pastes or gels with suitable solvents or when mixed with other waxes; a low viscosity at just above the melting point; and a low solubility in solvents for fats at room temperature. More preferably, the wax compositions of the present invention exhibit at least two of these properties, more preferably at least three of these properties, even more preferably at least four of these properties, and most preferably, each of the five properties.

The wax compositions of the present invention can preferably further include at least one other component selected from paraffin waxes, microcrystalline waxes, high density low molecular weight polyethylene waxes, by-product polyethylene waxes, Fischer-Tropsch waxes, oxidized Fischer-Tropsch waxes, hydroxy stearamide waxes, fatty amide waxes, and combinations thereof. Other waxes and additives as described above with reference to the hot melt adhesive applications can also be used in the wax compositions of the present invention. The wax compositions of the present invention can be made into layers, coatings or films that are useful as protective coatings for articles. Layers, coatings and films consisting essentially of the wax compositions of the present invention are within the realm of the present invention. Articles having a protective coating thereon, wherein the protective coating includes or consists essentially of the wax composition of the present invention are also provided by the present invention.

The wax compositions of the present invention can also include a pigment or dye. Food safe pigments or dyes are preferred for uses such as coating food products, and are known to those skilled in the art. Food products having a protective coating on a surface thereof, that includes the wax compositions of the present invention, are also within the realm of the present invention. The wax compositions of the present invention are particularly well suited for encapsulating food products to protect the food products, for example, as coatings for cheese products. In this regard, methods of protecting articles, including food products such as cheese products, are also included in accordance with embodiments of the present invention.

According to the present invention, a first protective layer of a biologically degradable hydrophobic polyhydroxyalkanoate can be coated onto the surface of the food product, such as cheese, from an aqueous dispersion or latex composition. Such a coating can be used to control the gas and moisture transmission properties out of the product. The hydrophobic polyhydroxyalkanoate allows the cheese to mature over a period of time. The maturation process can be terminated by application of a paraffin wax coating or, more preferably, a second polyhydroxyalkanoate coating applied to the surface of the dried latex applied polyhydroxyalkanoate coating. The second coating preferably terminates the maturation process and preferably provides a totally moisture and gas impervious barrier and a coating more resistant to mechanical damage. The coating temperature for applying the second coating of polyhydroxyalkanoate is preferably carried out at a temperature at which the second polyhydroxyalkanoate material, e.g., oligomer, is more molten, preferably in the range of from about 40° C. to about 90° C. More preferably, the glass transition temperature of the latex polyhydroxyalkanoate coating does not differ by more than about 20° C. from the glass transition temperature of the molten-applied second polyhydroxyalkanoate coating. More preferably, the glass transition temperature of the latex polyhydroxyalkanoate coating is in the range of from about 0° C. to about 35° C. The molecular weight of the molten-applied polyhydroxyalkanoate should be less than that of the polyhydroxyalkanoate latex polymer and preferably should differ by a number average molecular weight of more than about 10,000, and more preferably, more than about 50,000.

A method for producing a biologically degradable polyhydroxyalkanoate coating in the form of an elastomeric film is also provided according to the present invention. The method involves forming an aqueous dispersion of the low molecular weight or terminally modified polyhydroxyalkanoate. The dispersion is applied to the surface to be coated. Afterwards, the water is made or allowed to evaporate to obtain a film, wherein the film formation taking place at a temperature lower than the melting point of the polyhydroxyalkanoate. The method for producing a coating in the form of an elastomeric film according to the invention does not require further steps of hot fusion, hot pressing, or contact with chloroform or halogenated solvent to obtain the elastomeric characteristic. Selection of specific polyhydroxyalkanoates as starting material in an aqueous dispersion ensures elastomeric properties are acquired merely upon drying the aqueous dispersion after applying it to the surface to be coated. Suitably the method according to the invention can be carried out at a temperature more than about 35° C. lower than the melting point of the polyhydroxyalkanoate. Preferably, a polymer is used that has such low melting points, glass transition temperatures, and crystallinity that the film formation takes place at a temperature lower than the melting point of the polyhydroxyalkanoates and can even occur at a temperature more than about 35° C. below the melting temperature.

With the present method, spray drying of the dispersion and adding of organic solvents are no longer necessary. The processing of PHA to form a coating can be carried out just by applying the dispersion and by allowing it to dry. The polyhydroxyalkanoates of the PHB type probably do not form an impermeable film because of the high crystallinity and the high glass transition temperature of about 0–4° C. The polyhydroxyalkanoate preferably has a glass transition temperature below about 0° C.

According to an embodiment of the present invention, a method is provided for making a hot melt adhesive by combining a polyhydroxyalkanoate as a latex with a resin emulsion or a wax emulsion and spray drying the blend to make a hot melt adhesive without the need for a hot melt compounding process.

In the method according to the invention, a high-temperature step is unnecessary for sintering or melting for the purpose of film formation. Neither the presence of an organic solvent nor an intermediate step in which the aqueous dispersion of PHA is dried to form a powder and then dissolved in an organic solvent is necessary. With the method according to the present invention, it is therefore possible to coat products that may not be exposed to an excessively high temperature and/or to coat products which are applied to or consumed by a human being or animal and in which organic solvents must not be present. The coating does not per se need, however, to be applied to or consumed by the animal or the human being.

The method according to the present invention can be performed at a temperature in the range of about 0–30° C., preferably at a temperature in the range of about 10–18° C. The choice of temperature employed will depend on the product to be coated and on economic considerations. The PHA used will also be a factor on which the temperature to be used depends.

The method according to the invention can be performed with good results using a dispersion whose dry-matter content of PHA is at least about 10%. Outstanding results are achieved with a dry-matter content higher than about 30% and even higher than about 50%. Dispersions with a dry matter content higher than about 65% have been shown to be suitable embodiments for use in preparing elastomeric films according to the invention.

The dispersions preferably having a pH higher than about 8, preferably higher than about 10. Suitably the pH is about 12 as illustrated in the Examples. A dispersion according to the invention may further comprise more than about 30%, preferably more than about 50%, in particular more than about 65% polyhydroxyalkanoate as dry weight. Preferably an aqueous latex-like dispersion according to any of the aforementioned embodiments is substantially free of compounds toxic to a human being or animal.

An advantage of the use of dispersions is that standard additives such as stabilizers, plasticizers, fillers, dyes, emulsifiers, thickening agents, antioxidants, antistatics, preservatives, crosslinking agents, etc. can be added to the dispersion and the properties of the film can be simply improved and modified thereby. In addition, the presence of the water phase offers the possibility of mixing the PHA with other water-soluble, biologically degradable polymers. Other biologically degradable polymers which can be taken up in the dispersion comprise polyvinyl alcohol, gelatin, methylcellulose, polyethene oxide, PVP, starch. Furthermore, an antifungal agent can be taken up in the dispersion.

As stated above, the method according to the present invention can advantageously be used to coat foodstuffs, in particular, for coating cheese. The film which is obtained by the present method is outstandingly suitable for coating cheese. All the requirements which are imposed thereon with respect to suitable cheese coatings are fulfilled by the coatings of the present invention. In particular, the mechanical strength of the coating is a positive factor. The film obtained resembles a "latex" film. In an embodiment which is particularly suitable for producing a coating or film according to the invention, a drying time of less than about 24 hours at an atmospheric humidity of about 85% and a temperature of about 10–18° C. may be adequate. This method according to the invention is outstandingly suitable for producing a cheese coating.

The present invention also relates to a product coated with a polyhydroxyalkanoate film according to the present invention. In particular, a coated product according to the invention can be a product to be applied to or consumed by a human being or animal or a product which must not be exposed to about 100° C. or more. A suitable product is cheese. The product coated with polyhydroxyalkanoate film may also be composed of a mixture of polyhydroxyalkanoates of the above-mentioned type. The invention also relates to products coated with polyhydroxyalkanoate film of the above type which can be prepared by the method according to the invention.

Preferably, a film according to the invention is water resistant. In particular, the invention relates to an elastomeric film of polyhydroxyalkanoate which is suitable as a coating for products suitable to be applied to or consumed by human beings and/or animals. The film according to the invention can suitably be applied to a hydrophilic surface and exhibits good attachment properties to such a surface without requiring a heating step or any other step than drying at a temperature below $T_m$ (melting temperature). In fact temperatures more than about 35° C. below $T_m$ can even be applied. Cheese is a suitable product. A preferred film according to the present invention has an elongation at break of at least about 50%. Preferably, the elongation at break is over 200%. The dry-matter content of a film according to the invention can be more than about 10%, and preferably higher than about 30%, more preferably higher than about 50%. Another property of a film suitable in cheese coatings is a film containing less than about 4.5% of parts which are soluble in water. The typical gas permeability is 3–5 $l/m^2/hr$ at a temperature of about 20° C. and relative humidity of 90–0% for a film according to the invention. These values being for a film with a thickness of about 0.1 mm. The present invention is also directed to the lattices useful for the production of such films as can be produced in the various embodiments of the preparation method of coated products according to the invention.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hot melt adhesive composition comprising:
    at least one biodegradable polyhydroxyalkanoate having a molecular weight of from about 500 to less than 50,000;
    optionally comprising at least one tackifying resin; and
    optionally comprising at least one wax;
    wherein the hot melt adhesive composition has a viscosity of less than about 100,000 centipoise at 150° C., wherein the polyhydroxyalkanoate is selected from polymers of 4-hydroxyacids, 5-hydroxyacids, copolymers thereof, or blends thereof.

2. The hot melt adhesive composition of claim 1, further comprising at least one reactive monomeric component.

3. The hot melt adhesive composition of claim 2, wherein said reactive monomer is at least one of an epoxy monomer, an acrylate monomer, a methacrylate monomer, a silicone monomer, a siloxane monomer, a urethane monomer, an isocyanate monomer, an anhydride monomer, an oxime, and combinations thereof.

4. The hot melt adhesive composition of claim 1, wherein said at least one tackifying resin is present in said composition.

5. The hot melt adhesive composition of claim 1, wherein said at least one tackifying resin is present in said composition in an amount of up to about 60 wt % based on the total weight of the composition.

6. The hot melt adhesive composition of claim 1, wherein said at least one wax is present in said composition.

7. The hot melt adhesive composition of claim 1, wherein said at least one wax is present in said composition in an amount of up to about 40 wt % based on the total weight of the composition.

8. A hot melt adhesive composition comprising:
    at least one biodegradable polyhydroxyalkanoate having a molecular weight from about 1,000 to about 5,000, optionally comprising at least one tackifying resin, and optionally comprising at least one wax, wherein the hot melt adhesive composition has a viscosity of less than about 100,000 centipoise at 150° C., wherein the polyhydroxyalkanoate is selected from poly(hydroxybutyrate), polyhydroxybutyrate-co-4-hydroxybutyrate, polyhydroxybutyrate-co-3-hydroxyhexanoate, polyhydroxybutyrate-co-3-hydroxyheptanoate, polyhydroxybutyrate-co-3-hydroxyoctanoate, polyhydroxybutyrate-co-3 hydroxypropionate, or polyhydroxybutyrate-4-hydroxyvalerate or wherein the polyhydroxyalkanoate is selected from polymers of 3-hydroxyacids, 4-hydroxyacids, 5-hydroxyacids, copolymers thereof, or blends thereof.

9. The hot melt adhesive composition of claim 8, wherein the molecular weight is from about 1,000 to about 3,000.

10. The hot melt adhesive composition of claim 1, wherein the polyhydroxyalkanoate comprises a mixture of thermally depolymerizable polyhydroxyalkanoates.

11. The hot melt adhesive composition of claim 1, further comprising at least one thermally depolymerizable polymer other than polyhydroxyalkanoate.

12. The hot melt adhesive composition of claim 11, wherein the thermally depolymerizable polymer is selected from polycarbonates, polyolefins, polystyrenes, polyacetals, waxes, or combinations thereof.

13. The hot melt adhesive composition of claim 1, wherein the polyhydroxyalkanoate is dissolved in a solvent or a mixture of solvents.

14. The hot melt adhesive composition of claim 1, wherein said hot melt adhesive composition is biodegradable.

15. The hot melt adhesive composition of claim 2, wherein said hot melt adhesive composition is biodegradable.

16. An article comprising two components adhered together by the hot melt adhesive composition of claim 1.

17. An article comprising two components each having a respective surface, and wherein the respective surface of the two components are adhered together with the hot melt adhesive composition of claim 1.

18. A method of adhering two components together comprising:
providing two components; and
applying the hot melt adhesive composition of claim 1 to said two components to adhere said two components together.

19. A method of adhering two components together comprising:
providing two components;
applying the hot melt adhesive composition of claim 1 to at least one of said two components; and
contacting one of said two components with the other of said two components such that said hot melt adhesive composition is between said two components.

20. A hot melt adhesive composition comprising:
at least one biodegradable polyhydroxyalkanoate having a molecular weight of from about 500 to less than 50,000,
optionally comprising at least one tackifying resin, and
optionally comprising at least one wax,
wherein the hot melt adhesive composition has a viscosity of less than about 100,000 centipoise at 150° C., wherein the polyhydroxyalkanoate is selected from poly(hydroxybutyrate), polyhydroxybutyrate-co-4-hydroxybutyrate, polyhydroxybutyrate-co-3-hydroxyhexanoate, polyhydroxybutyrate-co-3-hydroxyheptanoate, polyhydroxybutyrate-co-3-hydroxyoctanoate, polyhydroxybutyrate-co-3 hydroxypropionate, or polyhydroxybutyrate-4-hydroxyvalerate or wherein the polyhydroxyalkanoate is selected from polymers of 3-hydroxyacids, 4-hydroxyacids, 5-hydroxyacids, copolymers thereof, or blends thereof, and wherein the polyhydroxyalkanoate is terminally modified to have at least one of the terminal end groups selected from:
a) $-CO-CH=CR^9R^{10}$;
b) $-OR^{11}$;
c) $-COOR^{12}$,
d) $-COR^{13}$; or
e) $-O^-M^+$ wherein $R^9$, $R^{10}$, and $R^{12}$ which are the same or different, represent saturated or unsaturated hydrocarbon radicals, halo- or hydroxy-substituted radicals, hydroxy radicals, nitrogen-substituted radicals, oxygen-substituted radicals, or a hydrogen atom, and wherein $R^{11}$ and $R^{13}$ which are the same or different, represent saturated or unsaturated hydrocarbon radicals, halo- or hydroxy-substituted radicals, hydroxy radicals, nitrogen-substituted radicals, or oxygen-substituted radicals, and $M^+$ is a counterion.

21. The hot melt adhesive composition of claim 20, wherein one of said terminal end groups is $-CO-CH=CR^9R^{10}$.

22. The hot melt adhesive composition of claim 20, wherein one of said terminal end groups is $-OR^{11}$.

23. The hot melt adhesive composition of claim 20, wherein one of said terminal end groups is $-COOR^{12}$.

24. The hot melt adhesive composition of claim 20, wherein said polyhydroxyalkanoate has molecular weight of from about 500 to less than 20,000.

25. The hot melt adhesive composition of claim 20, further comprising at least one reactive monomeric component.

26. The hot melt adhesive composition of claim 25, wherein said reactive monomer is at least one of an epoxy monomer, an acrylate monomer, a methacrylate monomer, a silicone monomer, a siloxane monomer, a urethane monomer, an isocyanate monomer, an anhydride monomer, an oxime, and combinations thereof.

27. The hot melt adhesive composition of claim 20, wherein said at least one tackifying resin is present in said composition.

28. The hot melt adhesive composition of claim 20, wherein said at least one tackifying resin is present in said composition in an amount of up to about 60 wt % based on the total weight of the composition.

29. The hot melt adhesive composition of claim 20, wherein said at least one wax is present in said composition.

30. The hot melt adhesive composition of claim 20, wherein said at least one wax is present in said composition in an amount of up to about 40 wt % based on the total weight of the composition.

31. The hot melt adhesive composition of claim 20, wherein the polyhydroxyalkanoate is a polymer of one or more subunits having the chemical formula:

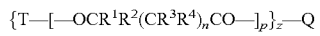

wherein n is 0 or an integer up to about 100; p is from about 0 to about 100; $R^1$, $R^2$, $R^3$, and $R^4$, which are the same as each other or different from one another, are each independently selected from saturated and unsaturated hydrocarbon radicals, halo- and hydroxy-substituted radicals, hydroxy radicals, halogen radicals, nitrogen-substituted radicals, oxygen-substituted radicals, or hydrogen atoms; T is selected from hydrogen, an alkyl, aryl, alkaryl, or aralkyl group containing from about 1 to about 20 carbon atoms, or an R'''COO carboxylate group wherein R''' is an aliphatic or aromatic hydrocarbon radical containing from about 1 to about 20 carbon atoms; and Q is selected from:

a hydroxy radical or an OR" radical wherein R" is a substituted or unsubstituted alkyl, aryl, alkaryl, or aralkyl radical containing from 1 to about 20 carbon atoms;

OAOH;

OAOOC(CH$_2$)$_y$CHROH;

OAO{OC(CH$_2$)$_y$CHRO}$_x$H; or

B;

wherein each R is independently selected from hydrogen, a saturated alkyl group having from about 1 to about 16 carbon atoms, an unsaturated alkyl group having from about 2 to about 16 carbon atoms, or mixtures thereof; A is (CH$_2$)$_m$ or (CH$_2$CHR'O)$_m$, where m is from about 1 to about 50 and R' is hydrogen or methyl; x is from about 2 to about 50; y is from 0 to about 3; and B is selected from:

trimethylol propane when z is 1, 2, 3 or a mixture of 1, 2, and/or 3, glycerol when z is 1, 2, 3 or a mixture of 1, 2, and/or 3, triethanolamine when z is 1, 2, 3 or a mixture of 1, 2, and/or 3, or sucrose when z is 1 to p where p is the number of free hydroxyl groups or derivatives present in said compound, and wherein the number average molecular weight of the compound is at least about 500.

32. The hot melt adhesive composition of claim 20, wherein the polyhydroxyalkanoate is selected from poly (hydroxybutyrate), polyhydroxybutyrate-co-hydroxyvalerate, polyhydroxybutyrate-co-4-hydroxybutyrate, polyhydroxybutyrate-co-3-hydroxyhexanoate, polyhydroxybutyrate-co-3-hydroxyheptanoate, or polyhydroxybutyrate-co-3-hydroxyoctanoate.

33. The hot melt adhesive composition of claim 20, wherein the polyhydroxyalkanoate comprises a monomer or a polymer selected from the group consisting of 3-hydroxyacids, 4-hydroxyacids, 5-hydroxyacids, copolymers thereof, and blends thereof.

34. The hot melt adhesive composition of claim 20, wherein the polyhydroxyalkanoate comprises a mixture of thermally depolymerizable polyhydroxyalkanoates.

35. The hot melt adhesive composition of claim 20, further comprising at least one thermally depolymerizable polymer other than polyhydroxyalkanoate.

36. The hot melt adhesive composition of claim 25, wherein the thermally depolymerizable polymer is selected from polycarbonates, polyolefins, polystyrenes, polyacetals, waxes, or combinations thereof.

37. The hot melt adhesive composition of claim 20, wherein the polyhydroxyalkanoate is dissolved in a solvent or a mixture of solvents.

38. The hot melt adhesive composition of claim 20, wherein said hot melt adhesive composition is biodegradable.

39. The hot melt adhesive composition of claim 21, wherein said hot melt adhesive composition is biodegradable.

40. An article comprising two components adhered together by the hot melt adhesive composition of claim 20.

41. An article comprising two components each having a respective surface, and wherein the respective surfaces of the two components are adhered together with the hot melt adhesive composition of claim 20.

42. A method of adhering two components together comprising:

providing two components; and applying the hot melt adhesive composition of claim 20 to said two components to adhere said two components together.

43. A method of adhering two components together comprising:

providing two components;

applying the hot melt adhesive composition of claim 20 to at least one of said two components; and contacting one of said two components with the other of said two components such that said hot melt adhesive composition is between said two components.

44. The hot melt adhesive composition of claim 1, wherein said polyhydroxyalkanoate is poly-4-hydroxybutyrate.

45. The hot melt adhesive composition of claim 20, wherein said polyhydroxyalkanoate is poly(3-hydroxybutyrate).

46. The hot melt adhesive composition of claim 4, wherein said tackifying resin is an aliphatic C5 resin, a polyterpene resin, a phenolic modified terpene resin, a hydrogenated resin, a mixed aliphatic-aromatic resin, a rosin ester, a rosin acid, a hydrogenated rosin ester, and a hydrogenated rosin acid.

47. The hot melt adhesive composition of claim 46, wherein said tackifying resin is present in an amount of from 10 wt % to 50 wt % by weight of the hot melt adhesive composition.

48. The hot melt adhesive composition of claim 6, wherein said wax is a paraffin wax, microcrystalline wax, Fischer-Tropsch wax, an oxidized Fisher-Tropsch wax, a synthetic high melting point wax, a hydroxy stearamide wax, a fatty amide wax, or a combination thereof.

49. The hot melt adhesive composition of claim 6, wherein said wax is a high density low molecular weight polyethylene wax, a by-product polyethylene wax, or a combination thereof.

50. The hot melt adhesive of claim 1, wherein said hot melt adhesive consists essentially of said biodegradable polyhydroxyalkanoate.

51. The hot melt adhesive composition of claim 20, wherein said hot melt adhesive consists essentially of said biodegradable polyhydroxyalkanoate.

52. The hot melt adhesive composition of claim 20, wherein one of said terminal end groups is —COR$^{13}$.

53. The hot melt adhesive composition of claim 20, wherein one of said terminal end groups is —O$^-$M$^+$.

54. The hot melt adhesive composition of claim 20, wherein one of said terminal end groups is —COOR$^{12}$ wherein R$^{12}$ represents saturated or unsaturated hydrocarbon radicals, halo- or hydroxy-substituted radicals, hydroxy radicals, nitrogen-substituted radicals, or oxygen-substituted radicals.

* * * * *